Jan. 9, 1951
J. F. O'BRIEN ET AL
2,537,080
REVERSE CURRENT CIRCUIT BREAKER
Filed April 19, 1945
4 Sheets-Sheet 1
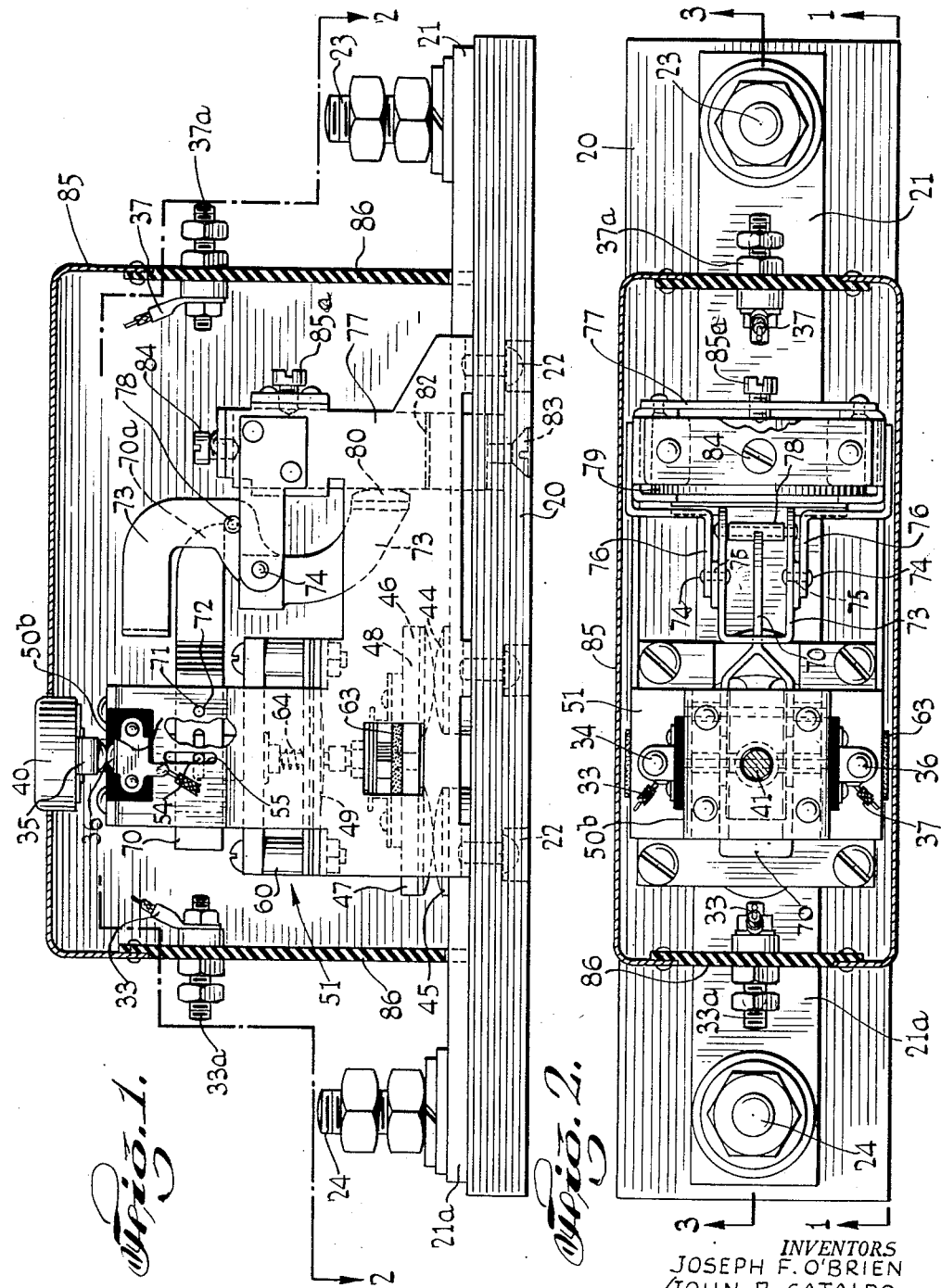
INVENTORS
JOSEPH F. O'BRIEN
JOHN B. CATALDO
BY
Henry J. Lucke
ATTORNEY

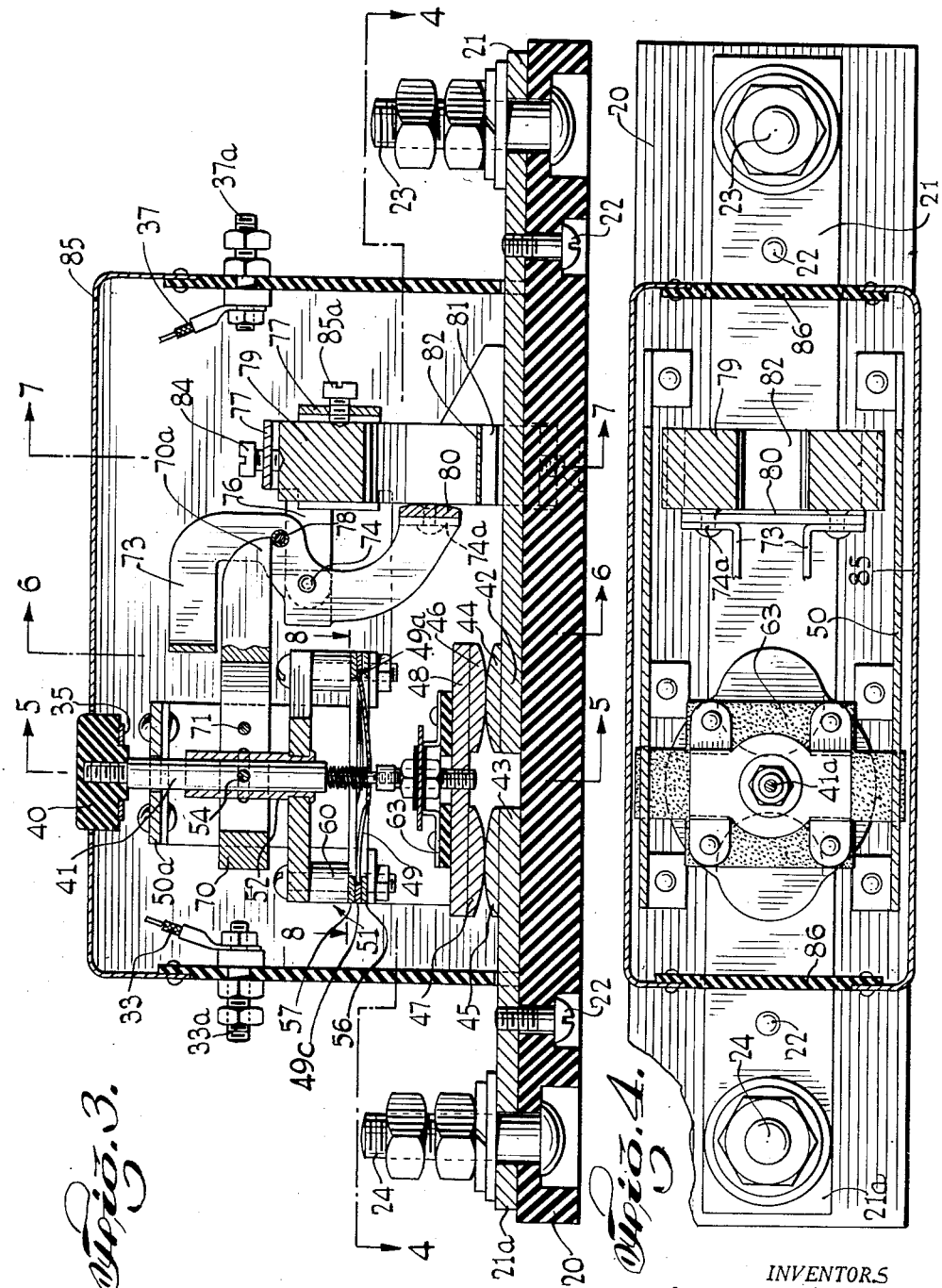

Jan. 9, 1951  J. F. O'BRIEN ET AL  2,537,080
REVERSE CURRENT CIRCUIT BREAKER
Filed April 19, 1945  4 Sheets-Sheet 3
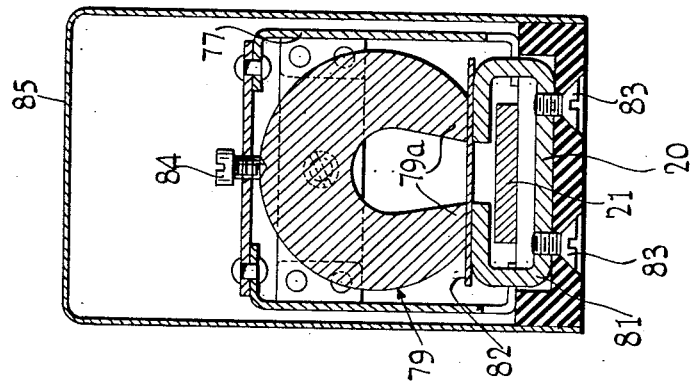
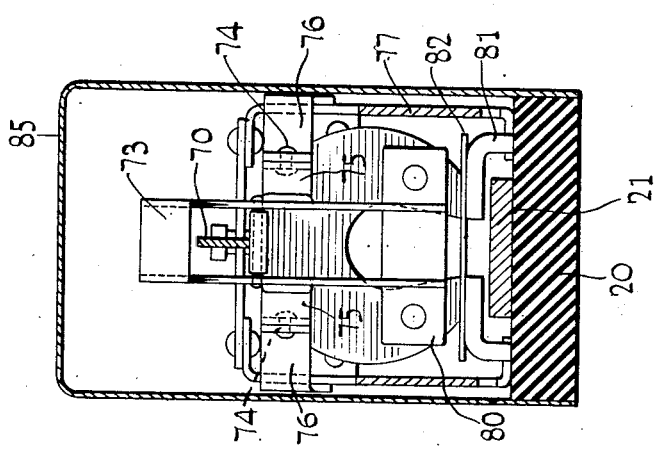
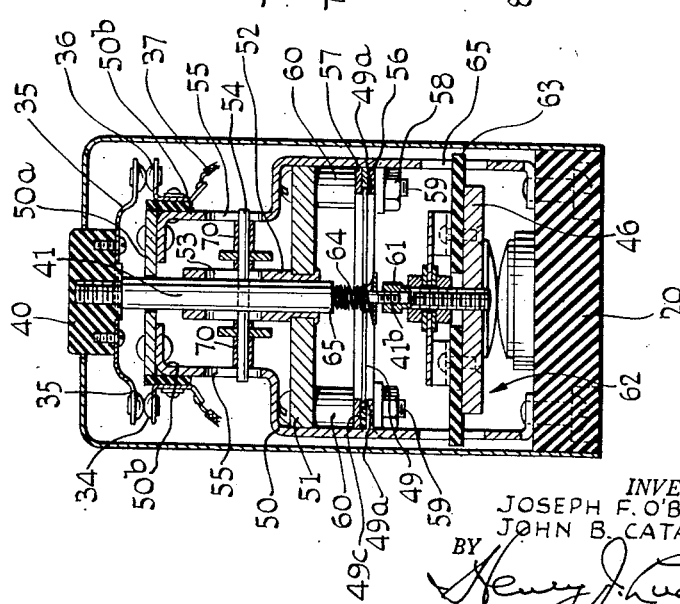
INVENTORS
JOSEPH F. O'BRIEN
JOHN B. CATALDO
BY
Henry J. Lucke
ATTORNEY

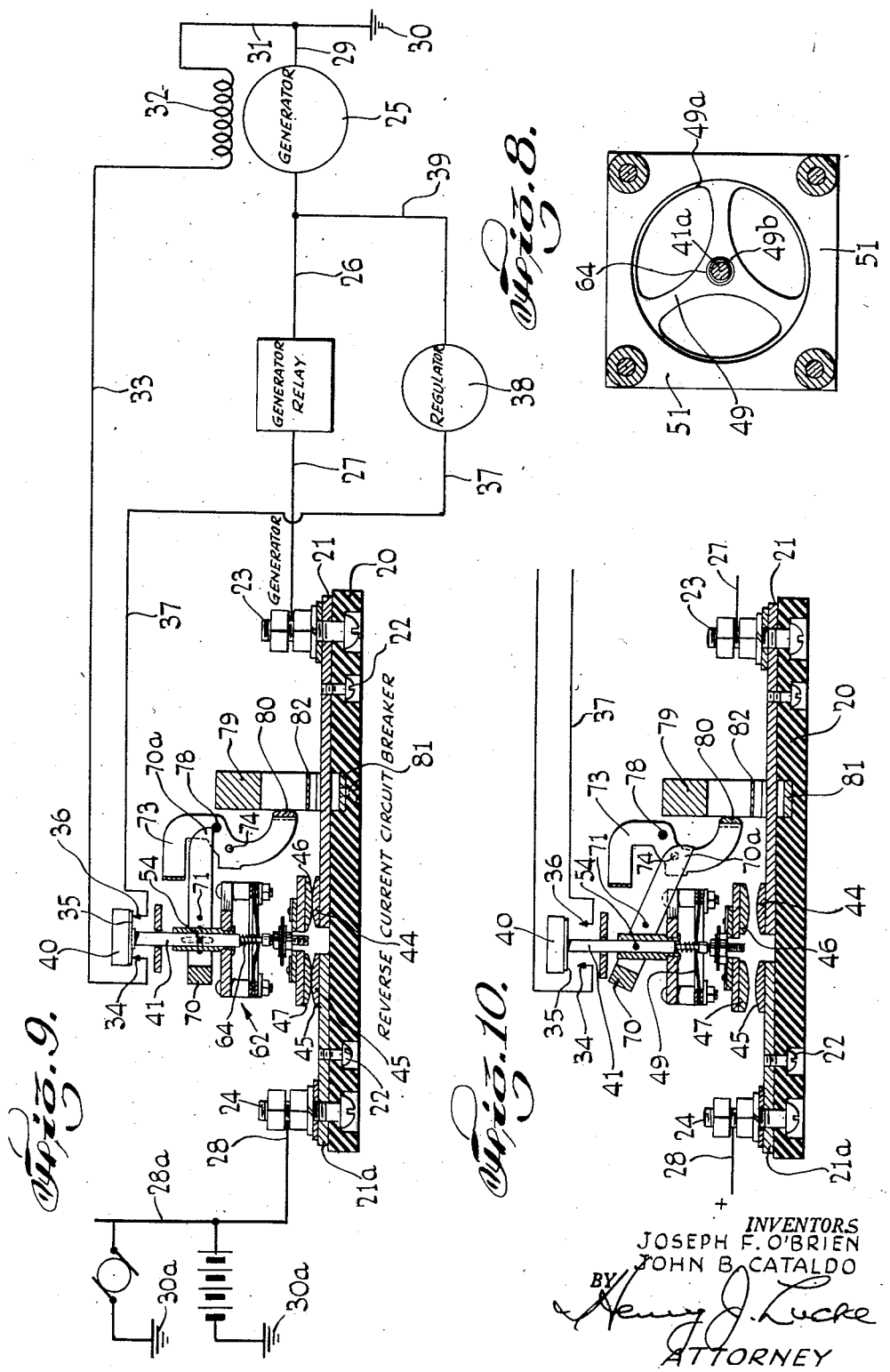

Patented Jan. 9, 1951

2,537,080

UNITED STATES PATENT OFFICE 2,537,080

REVERSE CURRENT CIRCUIT BREAKER

Joseph F. O'Brien, Lebanon, and John B. Cataldo, Summit, N. J., assignors to John B. Pierce Foundation, New York, N. Y., a corporation of New York Application April 19, 1945, Serial No. 589,204

7 Claims. (Cl. 200—106)

The present invention relates to an improved reverse current circuit breaker.

Pursuant to the invention, the operating mechanism of the circuit breaker comprises a switch rod carrying or controlling contacts arranged to close and open the load circuit, a latching mechanism co-acting with such switch rod to positively hold the shaft in firm circuit-closing position, such latching mechanism comprising a self-balancing member carrying an armature element responsive to the magnetic flux generated by the direct current of the load-circuit and co-operating with suitable permanent magnetic means whereby the latching mechanism when in circuit-closing position is substantially free from displacement under conditions of mechanical shocks or vibrations, and under condition of reversed current effects instant unlatching of such switch rod and the opening of the circuit breaker and consequent disconnection of the load circuit with the generator.

A feature of the present invention resides in the employment of an auxiliary circuit, connected to or controlling the field coils of the direct current generator, whereby upon actuation of the circuit breaker to circuit-closing position of the load circuit, the circuit of the field coils is closed, and whereby upon actuation of the circuit breaker to circuit-opening position of the load circuit, the circuit of the generator field coils is opened, thereby rendering the generator incapable of generation of electrical current, notwithstanding the continued rotation of its rotor.

The invention embodies the further improvement in combination with a disk type of snap spring, of a coil spring, co-operating jointly with such snap disk to control the switch rod operating mechanism of the circuit breaker, functioning among other advantages to enlarge the throw of such switch rod and thereby increase the contact-breaking gap of the circuit breaker.

Other structural features of the invention include the reduction of friction of the moving parts of the circuit breaker proper, calibration of the magnetic field jointly engendered by the permanent magnet and the load circuit, and improvements generally in enhancing the responsiveness of the circuit breaker to reversal of current in the load circuit while maintaining substantially complete freedom from disturbance of the operating parts due to mechanical shocks or vibrations, or bodily movement including bodily rotation of the circuit breaker and its associated parts.

The above stated structural and functional features render the invention particularly applicable to use on airplanes, including bombers and fighters, and to like vehicles which are subject to mechanical shocks and vibrations and considerable bodily movement.

Further features and objects of the invention will be more fully understood from the detailed description and the accompanying drawings, in which:

Fig. 1 is a vertical sectional view on line 1—1 of Fig. 2 of a preferred embodiment of the invention; this view illustrates the circuit breaker in circuit-closing position.

Fig. 2 is a horizontal sectional view taken on line 2—2 of Fig. 1.

Fig. 3 is a vertical central sectional view on line 3—3 of Fig. 2, and shows the circuit breaker in circuit-closing position.

Fig. 4 is a horizontal sectional view on line 4—4 of Fig. 3.

Fig. 5 is a vertical transverse sectional view on line 5—5 of Fig. 3.

Fig. 6 is a vertical transverse sectional view on line 6—6 of Fig. 3.

Fig. 7 is a vertical sectional view on line 7—7 of Fig. 3.

Fig. 8 is a detail horizontal sectional view on line 8—8 of Fig. 3.

Fig. 9 is a schematic view of certain essential parts of the reverse current circuit breaker shown in the preceding figures and embodies a diagram of the circuit connections. Fig. 9 shows the circuit breaker in circuit-closing position.

Fig. 10 is a schematic view of the parts corresponding to Fig. 9, but showing the circuit breaker in circuit-open position.

Referring first to Figs. 9 and 10 respectively illustrating schematically a direct current generator control circuit, typical of a circuit arrangement to which the present reverse current circuit breaker is applicable, 20 represents a suitable base, of suitable insulation material, to which is affixed the bus sections 21, 21a, secured as by the set screws 22, and respectively provided with terminals 23, 24, which are suitably connected respectively with the direct current generator 25 and the positive bus of the load circuit. Specifically, the indicated circuit diagram of Fig. 9 shows the connection of one pole of the generator 25 connected through leads 26, 27, to the stated bus terminal 23 and the lead 28 connecting the stated bus terminal 24 to the positive bus 28a. The return circuit is usually grounded, as through the lead 29 of the opposite pole of the generator running to "Ground" indicated at 30, and connections to "Ground" indicated at 30a of the negative terminals of the respective motors and other instrumentalities, usually including a storage battery. The diagrammatic circuit shows further the connection of the lead 31 from the stated opposite pole of the generator through generator field coils indicated at 32 and thence by the lead 33 to the switch associated with the circuit breaker proper comprising the contact 34, the bridging contact strip 35 and the contact 36; the contact 36 is shown connected by the lead 37 through the voltage regulator 38, of the direct current generator 25, and thence by the leads 39, 26, to the stated opposite pole of the generator 25. The circuit may include a "Generator relay," so marked, connected between the leads 26, 27, as shown.

In the diagram of Fig. 9, the contact strip 35 is indicated as carried on the under face of the re-set button 40 of the circuit breaker. The contacts 34, 36, are suitably mounted whereby upon manual operation of the re-set button 40, the contact strip 35 bridges the contacts 34, 36, as is indicated in Fig. 9 under the condition of circuit-closure of the circuit breaker; upon opening of the circuit breaker, and consequent upward movement of the re-set button 40 coincident to circuit-open position of the circuit breaker, the contact strip 35 is moved to its circuit-opening position relative to the contacts 34, 36, as is indicated in Fig. 10.

Essentially, the reverse current circuit breaker comprises an operating switch rod 41 controlled by the re-set button 40 as by mounting the latter at the upper end of the former, such switch rod 41 being reciprocally mounted within suitable guide means, and actuated under conditions of circuit-opening of the circuit breaker by suitable snap actuating means.

As indicated in Figs. 9 and 10, and shown in detail in Figs. 1, 3 and 5, the bus sections 21, 21a, are respectively provided at their juxtaposed but spaced end portions 42, 43, with contacts 44, 45, with which co-operate the contacts 46, 47, mounted upon a suitable shorting bar 48 carried by or otherwise controlled by the actuating switch rod 41.

As indicated in Figs. 9 and 10, and shown more particularly in Figs. 1, 3 and 5, preferred embodiments of the instant invention comprise a snap spring of the disk type, one form of which is illustrated in Fig. 8, in this instance a 3-radial type of snap disk spring 49, which desirably has a single position of stable equilibrium.

Snap springs of the disk type of the double position as well as a single position of equilibrium are illustrated and described more particularly in the copending application of William E. Stilwell, Jr., Serial No. 441,382, filed May 1, 1942, now Patent No. 2,358,357, September 19, 1944, and the thereof continuation application Serial No. 628,447, filed November 14, 1945.

As specifically illustrated in Figs. 1 through 5, the switch rod 41 is reciprocally mounted in the frame 50, the upper end of the shaft extending slidably through a suitable opening in the upper member 50a of such frame. The snap disk 49 is mounted in the carriage 51 which is slidably secured to the switch rod 41 by the sleeve 52 having the aligned slots 53 co-operating with the pin 54, which is fixedly secured in a suitable perforation passing transversely through the switch rod 41. The downward and upward movement of the switch rod 41 is guided and limited by the ends of the pin 54 riding in the opposite guide slots 55 formed in the upper frame parts 50b, 50b, of the frame 50. As shown in the drawings and in particular in Figs. 3 and 5, the snap spring 49 is held in position at its rim portion 49a as by the oppositely disposed annular rings 56, 57, and tightened by the nuts 58, 58, of the screw bolts 59, 59, passing through the spacer sleeves 60, 60, thereby predeterminedly locating the snap spring 49 with respect to its carriage 51.

The actuating switch rod 41 is associated with the snap spring 49 by a lost motion connection therewith, as by providing a reduced portion 41a of the switch rod 41 which is passed through an opening in the central portion 49b, see also Fig. 8, of the snap spring 49, the effective extent of such lost motion being calibrated by suitable means. One such form of such calibration is had, as shown in the drawings and in particular Figs. 3 and 5, by the provision of the threaded end 41b of the reduced rod portion 41a, the threads of which mate with the inner threads of the head of the hollow screw 61, the external threads of which mate with the threading of the contact carrying assembly, designated generally 62, supporting the shorting bar 48 and the circuit breaker contacts 46, 47.

As shown, particularly in Figs. 3 and 5, the shorting bar 46 is suitably insulated from the switch rod assembly, as by the insulating plates 63.

Associated with such snap spring 49, is a coil spring 64, which extends from the upper face of the central portion 49b of the snap spring 49 against which its one end abuts, the opposite end of the coil spring 64 abutting against the lower face 65 of the enlarged, i. e. main, body portion of the switch rod 41.

Assuming that it is desired to set the circuit breaker in its circuit-closing position, the re-set button 40 is depressed whereby the switch rod 41 is forced downwardly, causing a contraction of the coils of the coil spring 64, by direct convolution-to-convolution engagement; the central portion 49b of the snap spring 49 is thereby flexed downwardly, until the contacts 46, 47, are brought into engagement with the bus contacts 44, 45. As is more specifically described hereinafter, suitable latching mechanism is provided for maintaining the switch rod 41 and the circuit breaker contacts 46, 47, in circuit-closing position. Such latching mechanism is responsive to reverse current condition and acts to unlatch the switch rod 41 and thereby to release the circuit breaker. So unlatched, the switch rod breaks the circuit under the influence of the snap spring 49 and associated coil spring 64, and instantly separates the contacts 46, 47, with respect to the bus contacts 44, 45. Also, simultaneously therewith the generator field coil circuit is interrupted by separation of the contact strip 35, carried by the button 40, from engagement with the contacts 34, 36.

Assuming the snap spring 49 to be one having a position of stable equilibrium, the snap spring is positioned to be in unstable equilibrium when the circuit breaker is latched, i. e., in its circuit-closing position with respect to the load circuit. Accordingly, when the circuit breaker is released by its latching mechanism, described hereinafter, under conditions of reverse current in the load circuit, or when unlatched by manual operation, an instantaneous upward movement is imparted to the switch rod 41 by the direct flipping of the central portion 41b of the snap spring relative to its fixed rim portion, thereby forcibly acting directly against the now compressed coil spring 64, whereupon the coil spring is released in expansion and combines with the flipping central portion 49b of the snap spring to snap the body portion of the switch rod 41 upwardly, and therewith correspondingly elevate the carriage 51 and dislodge the shorting bar 48 and its contacts 46, 47, from engagement with the load circuit contacts 44, 45, thereby throwing the circuit breaker into its circuit-opening position.

Such upward movement of the switch rod 41 is guided by its pin 54 riding in the oppositely disposed guide slots 55, 55, of the frame part 50b.

Advantageously, the lower portion of the switch rod assembly is also guided in its upward and downward movements, as by utilizing the insulation plate 63 to extend within the oppositely disposed wide slots or openings 65, 65, in the lower part of the frame 50.

As an effective form of latching mechanism for the switch rod 41, there is provided the latching lever 70, shown of yoke form, which is positively connected with minimum friction with the switch rod 41, as by rotative engagement with the stated pin 54. The latching lever 70 is shown pivotally mounted on a pivot pin 71, see Figs. 3, 9 and 10, bearing at its opposite ends in the oppositely disposed pivotal openings 72 in the respective opposite sides of the upper frame part 50b. Associated with such latching lever 70 is a clapper arm 73, shown of S-shape, pivoted at its center of mass, indicated in Fig. 1 at 74, as by pivot rivets 75 passing through registering pivot openings, as shown, in the bracket arms 76, 76, connected to or integral as extensions of the frame 77, which is suitably secured at its feet to the insulation base 26. Coaction of the latching lever 70 with the clapper arm 73 is shown attained by the provision of a detent, preferably in the form of a roller 78, positioned upon the clapper arm assembly to be engaged by the arcuate nose 70a of the latching lever 70. By reference to Fig. 10, which illustrates the latching lever 70 in unlatched position relative to the switch rod 41, it will be observed that the arcuate face of its nose 70a is moved upwardly, when the re-set button 40 is pushed downwardly (to thereby move the shaft 41 downwardly). The nose 70a engages the roller 78 with minimum friction, causing the clapper arm 73 to be slightly displaced rotatively clockwise, as viewed in Fig. 10, and upon the switch rod 41 attaining its lowermost position, and thereby rotating the latching lever 70 in counter-clockwise direction, its nose 70a has cleared the roller 78, whereupon due to the self-balancing of the clapper arm 73, presently explained, the clapper arm 73, returns in counter-clockwise movement to position the roller 78 into latching relation with the nose 70a.

Co-operating with such latching assembly, inclusive of the clapper arm, suitable means are provided whereby the clapper arm is retained in locking position with the latching lever under condition of normal current flow in the load circuit and actuated to unlock the latching lever under condition of reverse current in the load circuit. Such provision of means is shown by the employment of a permanent magnet 79 and an armature shown in the form of a strip 80, of suitable magnetic material, preferably soft steel, carried at the lower end of the clapper 73, and additionally by the provision of a convolution of magnetic material, preferably soft steel, responsive to the current passing through the load circuit, whereby under condition of normal direct current in the load circuit, the combined magnetic field induced by such convolution and the permanent magnet respectively, the armature 80 is attracted and thereby maintains the clapper arm 73 in position locking the latching lever 70 in latched relation with the shaft 41 of the circuit breaker, and under the condition of reverse current in the load circuit, the armature 80 is displaced, thereby rotating the clapper arm 73 in clockwise direction, releasing the nose 70a of the latching lever and thereby releasing the switch rod 41 of the circuit breaker, thus opening the circuit breaker and disconnecting the bus section 21 from the bus section 21a, and as above set forth, simultaneously therewith opening the field coil circuit of the generator 25.

The self-balancing of the clapper arm 73, referred to above, is attained by pivoting the clapper arm, inclusive of its detent roller 78 and the armature plate 80, on an axis passing through the center of the combined mass.

As one effective manner of co-ordinating the magnetic field controlling the armature 80, the permanent magnet 79 is adjustably stationarily mounted within the stated frame 77, and a convolution embracing the bus section 21, such convolution, as shown, being in the form of a flattened C-shape strip 81 of magnetic material, preferably soft steel; a flat plate 82 of non-magnetic material, such as brass, is shown bridging the open ends of the C-shaped convolution. The permanent magnet 79 is supported at its pole faces 79a, 79a, upon such flat plate, the poles of the permanent magnet being positioned whereby under condition of normal current flow through the bus section 21, the magnetic fields engendered jointly by the convolution 81 and the permanent magnet are opposite in direction of magnetic flow, the armature 80 is attracted, and under reverse current flow the armature 80 is released. The electro-magnet 81 is thus inductively coupled to the circuit in the bus sections and is polarized in one sense by current flowing in normal direction and in the opposite sense by current flowing in reverse direction. Since the fixed permanent magnet 79, which has its poles disposed adjacent to the respective poles of the electro-magnet 81, is polarized to oppose the flux of the electro-magnet when current in the bus sections flows in normal direction, the combined flux of the two magnets will attract the armature 80. This is so because the armature provides a passage for the flux of each magnet and is thereby drawn toward the poles of the two magnets. When current flows reversely in the bus sections polarization of the electro-magnet is reversed and a passage for the flux of each magnet is provided through the other. Consequently, no flux is required to pass through the armature, which is thereupon released.

The stated C-shape strip 81 is secured in stationary position, as by means of set screws 83, 83, passing through suitable openings in the insulation base 26. Adjustable positioning of the permanent magnet 79 is attained by the selection of such flat plate 82 of proper thickness from a set of flat plates of variant thicknesses, and by tightening the permanent magnet in position, as by screws 84, 85a, carried by the frame 77, the former engaging the top of the permanent magnet 79, and the latter laterally thereof, see Figs. 1 and 2.

In recapitulation, having calibrated the permanent magnet assembly by selection of the proper thickness of the brass plate 82, and assuming the condition of normal current flow and the circuit breaker to be set in circuit-closing position, the combined magnetic flux created jointly by the permanent magnet 79 and the electro-magnetic convolution 81, by the normal direct current flowing through the bus section 21, the armature 80 is jointly attracted, thereby stabilizing the clapper arm 73 in its locking position with the latching member 70, thereby latching the switch rod 41, thus maintaining the relay contacts 46, 47, in firm engagement with the bus contacts 44, 45. However, under condition of reverse current flow through the bus section 21, a reverse magnetic field is induced by the electro-magnetic convolution 81, thereby creating a magnetic field which aligns with that of the permanent magnet 79, thus reducing the intensity of the combined magnetic flux effecting the armature 80 to an extent less than the force exerted by the lever arm 70 through the detent, or roller, 78 upon the clapper arm 73, causing the clapper arm 73 to turn in clockwise direction, thereby displacing the armature 80, and coincidentally unlocking the latching member 70, affording the spring 49 and the coil spring 64 to jointly snap the switch rod 41 upwardly, thereby throwing the relay to its circuit-open position and concomitantly interrupting the reverse current flow through the bus section 21 and the generator 25. The above stated operations and functions take place independently of gravitational effect upon the concerned parts.

In consequence of such positive disconnection of the generator from the source of reverse current, the field coil circuit of the generator 25 is simultaneously opened by disconnection of the contact bar 35 from the contacts 34, 36, of the field coil circuit indicated by the leads 33, 37, 39, 29 and 31.

It will be observed that a complete electro-magnetic circuit is provided by the C-shaped convolution 81 of soft steel, the poles of which are disposed spacedly corresponding to but of opposite polarity with respect to the poles of the permanent magnet, thereby attaining maximum attraction of the armature under normal current flow and instantly effective displacement of the armature under reverse current flow. Also, the provision of the armature being carried by the self-balanced clapper assembly and its mounting relative to the poles of the permanent magnet, insure stable positioning of the clapper arm-armature assembly under the condition of no current flow in the load circuit, thereby insuring positive action of latching of the switch rod upon manual or remote resetting of the circuit breaker, notwithstanding that the circuit breaker parts may be subjected to shock, or other mechanical vibration or bodily displacement of the circuit breaker as an entirety, as when installed on an airplane.

The circuit breaker is shown housed within a cover 85 formed at its lateral sides of insulation 86, 86, and the remainder of other suitable material, such as metal, or the cover 85 as a whole may be moulded or otherwise formed of a suitable plastic. The insulating cover side parts 86, 86, afford support for the binding posts 33a, 37a, respectively connected in circuit with the leads 33, 37, running to the field coil contacts 34, 36, respectively.

Preferably, as set forth hereinabove, the snap spring 49 is of the disk type, shown in Fig. 8 as circular in the outer and inner peripheries of its rim, and having a plurality of spokes which merge centrally at the center portion 49b of the snap disk spring. Three of such spokes are illustrated in Fig. 8. Such snap disk spring in its position of stable equilibrium (in which status it is when the circuit breaker is in circuit-open position) assumes an arcuate configuration, that is to say, the spokes are bowed to an arcuate configuration which continues to and includes the rim. When the circuit breaker is re-set in its circuit-closing position, the snap disk spring again assumes an arcuate configuration which is the reverse of its stated arcuate configuration. To afford such flexing movement of the rim when the snap disk spring is mounted as hereinabove described, see Figs. 1, 3 and 5, a restricted play of the rim is afforded by the provision of an annular spacer ring 49c, see Figs. 3 and 5, which is interposed between the oppositely located annular clamp rings 56, 57, the spacer ring 49c having an inner diameter greater than that of the clamp rings 56, 57, to thereby provide a pocket of restricted dimensions within which the rim of the snap disk spring is restrictedly held in its flexing movement, coincident with the flexing of the spokes of the snap disk spring from one arcuate configuration to the opposite, and reversely.

We claim:

1. In a circuit breaker adapted for a reverse current circuit, the combination of contacts respectively connected with the load circuit; movable contact means co-operating with said load circuit contacts to close and open the load circuit; switch rod means controlling the movement of said movable contact means; snap spring means controlling said switch rod means; latching lever means for holding said switch rod means in latched position; clapper arm means co-operating with said latching lever means to lock the same in latched position; an armature carried by said clapper arm means; means for pivotally mounting said latching lever means; means pivotally mounting said clapper arm and said armature at their combined center of mass to effect self-balancing and stabilization; and magnetic means including a permanent magnet and electromagnetic means in inductive relation with the load circuit having their respective adjacent poles of like polarity under normal load circuit condition controlling said armature, whereby, under the condition of passage of normal current through the load circuit, said armature is attracted, whereby said clapper arm is maintained in stabilized locked relation with said latching lever means and said latching lever means in latched relation with said switch rod means and whereby, under condition of reverse current flow through said load circuit, said armature is released thereby unlocking said latching lever means and releasing said snap spring means to throw the circuit breaker to its circuit-opening position.

2. In a circuit breaker adapted for a reverse current circuit, the combination of contacts respectively connected with the load circuit; movable contact means co-operating with said load circuit contacts to close and open the load circuit; switch rod means controlling the movement of said movable contact means; snap spring means controlling said switch rod means; said snap spring means having a single position of stable equilibrium and disposed in unstable equilibrium when said switch rod means effects circuit closure of said movable contact means with said load circuit contacts; latching lever means for holding said switch rod means in latched position; clapper arm means co-operating with said latching lever means to lock the same in latched position; an armature carried by said clapper arm means; means for pivotally mounting said latching lever means; means pivotally mounting said clapper arm and said armature at their combined center of mass to effect self-balancing and stabilization; and magnetic means including a permanent magnet and electromagnetic means in inductive relation with the load circuit having their respective adjacent poles of like polarity under normal load circuit condition controlling said armature, whereby, under the condition of passage of normal current through the load circuit, said armature is attracted whereby said clapper arm is maintained in stabilized locked relation with said latching lever means and said latching lever means in latched relation with said switch rod means, and, under condition of reverse current flow through said load circuit, said armature is released thereby unlocking said latching lever means and releasing said snap spring means to throw the circuit breaker to its circuit-opening position.

3. In a circuit breaker adapted for a reverse current circuit, the combination of contacts respectively connected with the load circuit; movable contact means co-operating with said load circuit contacts to close and open the load circuit; switch rod means controlling the movement of said movable contact means; snap spring means controlling said switch rod means; latching lever means for holding said switch rod means in latched position; clapper arm means co-operating with said latching lever means to lock the same in latched position; an armature carried by said clapper arm means; means for pivotally mounting said latching lever means; means pivotally mounting said clapper arm and said armature at their combined center of mass to effect self-balancing and stabilization; and magnetic means including a permanent magnet and electromagnetic means in inductive relation with the load circuit controlling said armature, the poles of said electromagnetic means being disposed respectively adjacent the poles of said permanent magnet and respectively of like polarity under normal load circuit condition, whereby, under the condition of passage of normal current through the load circuit, said armature is attracted whereby said clapper arm is maintained in stabilized locked relation with said latching lever means and said latching lever means in latched relation with said switch rod means, and, under condition of reverse current flow through said load circuit, said armature is released thereby unlocking said latching lever means and releasing said snap spring means to throw the circuit breaker to its circuit-opening position.

4. In a circuit breaker adapted for a reverse current circuit, the combination of contacts respectively connected with the load circuit; movable contact means co-operating with said load circuit contacts to close and open the load circuit; switch rod means controlling the movement of said movable contact means; snap spring means controlling said switch rod means; latching lever means for holding said switch rod means in latched position; clapper arm means co-operating with said latching lever means to lock the same in latched position; an armature carried by said clapper arm means; means for pivotally mounting said latching lever means; means pivotally mounting said clapper arm and said armature at their combined center of mass to effect self-balancing and stabilization; and magnetic means including a permanent magnet and a convolution of magnetically conducting material embracing a portion of the load circuit controlling said armature, the poles of said electromagnetic means being respectively adjacent the poles of said permanent magnet and of like polarity under normal load circuit conditions, whereby, under the condition of passage of normal current through the load circuit, said armature is attracted whereby said clapper arm is maintained in stabilized locked relation with said latching lever means and said latching lever means in latched relation with said switch rod means, and, under condition of reverse current flow through said load circuit, said armature is released thereby unlocking said latching lever means and releasing said snap spring means to throw the circuit breaker to its circuit-opening position.

5. In a circuit breaker adapted for a reverse current circuit, the combination of contacts respectively connected with the load circuit; movable contact means co-operating with said load circuit contacts to close and open the load circuit; switch rod means controlling the movement of said movable contact means; snap spring means controlling said switch rod means; latching lever means for holding said switch rod means in latched position; clapper arm means co-operating with said latching lever means to lock the same in latched position; an armature carried by said clapper arm means; means for pivotally mounting said latching lever means; means pivotally mounting said clapper arm and said armature at their combined center of mass to effect self-balancing and stabilization; and magnetic means including a permanent magnet and electromagnetic means in inductive relation with the load circuit and having its poles respectively adjacent the poles of said permanent magnet and of like polarity under normal load circuit condition and means for adjustably mounting said permanent magnet controlling said armature, whereby, under the condition of passage of normal current through the load circuit, said armature is attracted whereby said clapper arm is maintained in stabilized locked relation with said latching lever means and said latching lever means in latched relation with said switch rod means, and, under condition of reverse current flow through said load circuit, said armature is displaced thereby unlocking said latching lever means and releasing said snap spring means to throw the circuit breaker to its circuit-opening position.

6. A reverse current circuit breaker comprising: separate bus sections between which a load line is broken; a shorting bar for bridging said separate bus sections to close the load line circuit; a switch rod fixed to said shorting bar for moving it into and out of circuit closing position; a snap spring connected to said switch rod for quickly moving it out of circuit closing position; and a latching lever movable with said switch rod for holding said switch rod in circuit closing position; in combination with a pivoted clapper arm; a roller on said clapper arm eccentric to the pivot thereof for engaging said latching lever at one end thereof and locking it in circuit closing position; an armature carried by said clapper arm eccentric to the pivot thereof in the same sense as is said roller; and magnetic means responsive to current in one direction in said bus sections for holding said clapper arm in locking position with said roller and said latching lever.

7. A reverse current circuit breaker comprising: separate bus sections between which a load line is broken; a shorting bar for bridging said separated bus sections to close the load line circuit; a switch rod fixed to said shorting bar for moving it into and out of circuit closing position; a snap spring connected to said switch rod for quickly moving it out of circuit closing position; and a latching lever movable with said switch rod for holding said switch rod in circuit closing position; in combination with a pivoted clapper arm; a roller on said clapper arm eccentric to the pivot thereof for engaging said latching lever at one end thereof and locking it in circuit closing position; an armature carried by said clapper arm eccentric to the pivot thereof in the same sense as is said roller; an electromagnet inductively coupled to the circuit in said bus sections for polarization in one sense by current flowing in normal direction and in the opposite sense by current flowing in the reverse direction; and a fixed permanent magnet having its poles disposed adjacent to the respective poles of said electro-magnet to oppose the flux of said electromagnet when current in the circuit flows in normal direction, and augment the flux of said electromagnet when current flows in the circuit in reverse direction; whereby current flowing in normal direction in the circuit will cause the opposing flux of said magnets to seek a passage through said armature to draw said armature toward the poles of said magnets and hold the roller on said clapper arm in locking engagement with said latching lever; and whereby reverse current in the circuit will reverse the flux in said electromagnet thereby providing a passage for the flux of each magnet through the other to release said armature and said pivoted clapper arm to the pressure of said latching lever upon said roller.

JOSEPH F. O'BRIEN.
JOHN B. CATALDO.

REFERENCES CITED

The following references are of record in the file of this patent:

UNITED STATES PATENTS

| Number | Name | Date |
| --- | --- | --- |
| 570,212 | Wurts | Oct. 27, 1896 |
| 1,475,506 | Patterson | Nov. 27, 1923 |
| 1,701,440 | Chatto | Feb. 5, 1929 |
| 1,947,236 | Walle | Feb. 13, 1934 |
| 2,000,442 | Healis | May 7, 1935 |
| 2,036,295 | Piffath | Apr. 7, 1936 |
| 2,182,038 | Soulat | Dec. 5, 1939 |